United States Patent
Zoller et al.

(10) Patent No.: US 12,317,396 B2
(45) Date of Patent: May 27, 2025

(54) INDUCTION HEATING DEVICE

(71) Applicant: E. Zoller GmbH & Co. KG Einstell- und Messgeraete, Pleidelsheim (DE)

(72) Inventors: Alexander Zoller, Pleidelsheim (DE); Christian Pfau, Ingersheim (DE)

(73) Assignee: E. Zoller GmbH & Co. KG Einstell- und Messgeraete, Pleidelsheim (DE)

( * ) Notice: Subject to any disclaimer, the term of this patent is extended or adjusted under 35 U.S.C. 154(b) by 1209 days.

(21) Appl. No.: 16/822,226

(22) Filed: Mar. 18, 2020

(65) Prior Publication Data

US 2020/0323045 A1    Oct. 8, 2020

(30) Foreign Application Priority Data

Apr. 2, 2019 (DE) .................... 10 2019 108 605.1

(51) Int. Cl.
*H05B 6/10* (2006.01)
*H05B 6/06* (2006.01)

(52) U.S. Cl.
CPC ................. *H05B 6/10* (2013.01); *H05B 6/06* (2013.01); *H05B 2206/02* (2013.01)

(58) Field of Classification Search
CPC ........ H05B 6/10; H05B 6/06; H05B 2206/02; B23B 31/1179; B23P 11/02
USPC ................................. 219/600, 661, 667, 677
See application file for complete search history.

(56) References Cited

U.S. PATENT DOCUMENTS

| | | | |
|---|---|---|---|
| 7,062,847 B2 * | 6/2006 | Haimer .............. | B23Q 17/0923 408/239 R |
| 7,278,194 B2 * | 10/2007 | Pfau ....................... | B23P 19/10 29/721 |
| 2019/0014620 A1 | 1/2019 | Podhrazky | |

FOREIGN PATENT DOCUMENTS

| | | | | |
|---|---|---|---|---|
| DE | 202007000870 U1 * | 5/2007 | ......... | B23B 31/1179 |
| DE | 10 2015 016 831 A1 | 6/2017 | | |
| JP | 2010017770 * | 7/2008 | ............ | B23P 11/027 |
| JP | 2009291913 A * | 12/2009 | ............ | B23P 11/027 |
| WO | 2019038190 A1 | 2/2019 | | |

OTHER PUBLICATIONS

Machine Translation of JP2010017770A (Year: 2023).*
Machine Translation of JP2009291913A (Year: 2023).*
(Continued)

*Primary Examiner* — Steven W Crabb
*Assistant Examiner* — Thomas J Ward
(74) *Attorney, Agent, or Firm* — Posz Law Group, PLC

(57) ABSTRACT

An induction heating device for a shrink-clamping and/or unshrink-unclamping of tools into and/or from tool holders, in particular an induction heating unit of a shrink-clamping and/or unshrink-unclamping station for tools, comprises an induction heating unit comprising at least one induction coil which is configured to expand, by heating, at least a portion of the tool holder during a shrink-clamping and/or unshrink-unclamping process, and includes at least one shielding unit which is at least configured for a shielding of an induction magnetic field generated by the induction heating unit at least substantially at least in an axial direction of the induction coil, wherein the induction heating unit and the shielding unit form structural units which can be operatively decoupled from each other and can thus be moved relative to each other at least in the axial direction.

17 Claims, 7 Drawing Sheets

(56) References Cited

OTHER PUBLICATIONS

Figure 1:
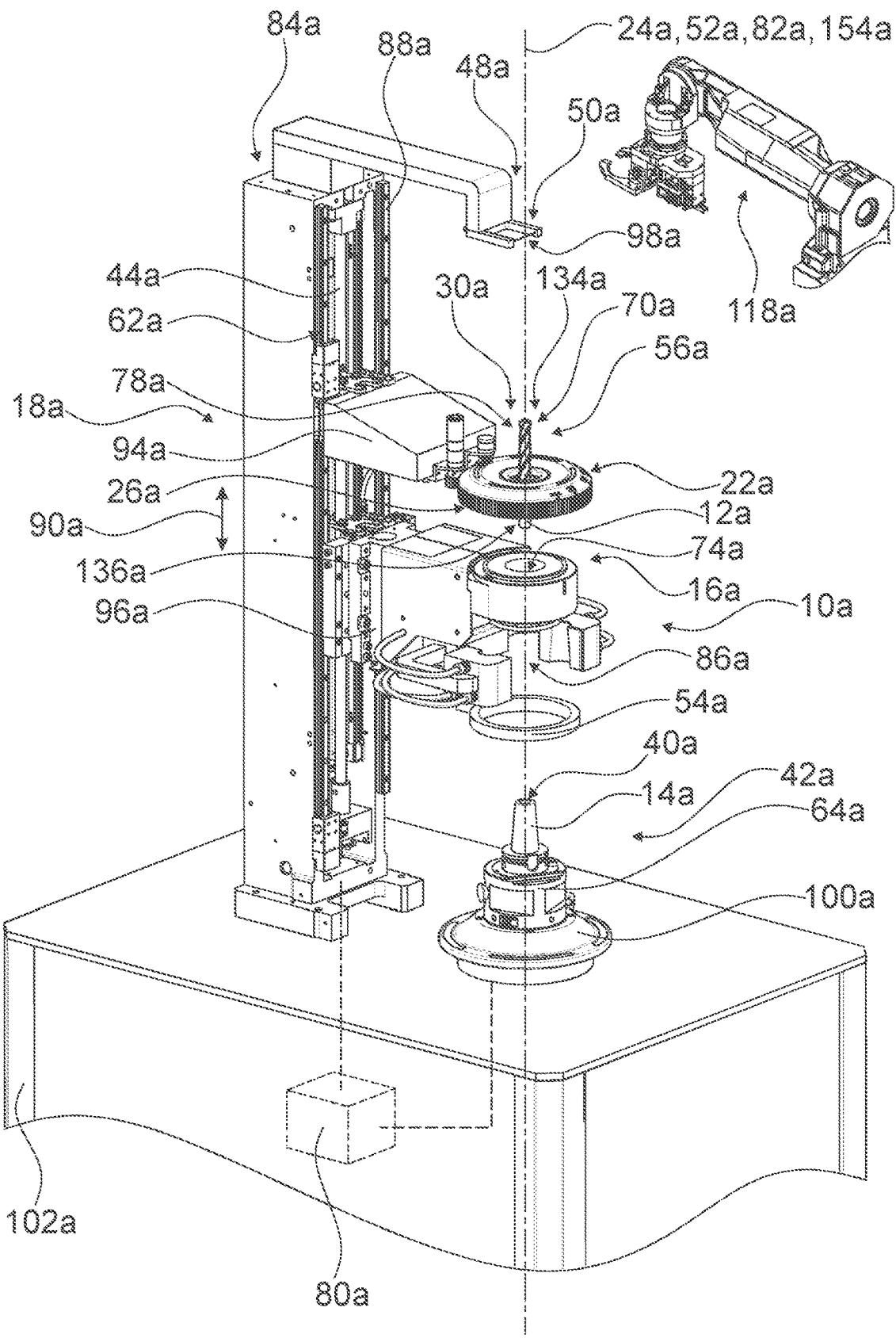

Machine Translation of DE-202007000870-U1 (Year: 2024).*
Extended European Search Report mailed Aug. 6, 2020 issued in corresponding EP patent application No. 20162409.5.
European Examination Report mailed Feb. 16, 2022 issued in corresponding EP patent application No. 20162409.5. 9 (and English translation).
Search Report mailed Dec. 4, 2019 issued in corresponding DE patent application No. 10 2019 108 605.1 (English translation only).

* cited by examiner

INDUCTION HEATING DEVICE

CROSS REFERENCE TO RELATED APPLICATION

This application is based on German Patent Application No. 10 2019 108 605.1 filed on Apr. 2, 2019, the contents of which are incorporated herein by reference.

PRIOR ART

The invention relates to an induction heating device, to a method with the induction heating device, to a shrink-clamping and/or unshrink-unclamping station, to a method with a shrink-clamping and/or unshrink-unclamping station, and to a method for a shrink-clamping or unshrink-unclamping of tools.

An induction heating device has already been proposed for a shrink-clamping and/or unshrink-unclamping of tools into and/or from tool holders, with an induction heating unit comprising at least one induction coil which is configured to expand, by heating, at least a portion of the tool holder during a shrink-clamping and/or unshrink-unclamping process, and with at least one shielding unit which is at least configured for a shielding of an induction magnetic field generated by the induction heating unit at least substantially at least in an axial direction of the induction coil.

The objective of the invention consists in particular in providing a generic device with advantageous properties with respect to a shrink-clamping process for tools. The object is achieved according to the invention by the features of at least the independent Patent Claims, whilst advantageous embodiments and developments of the invention can be sourced from the dependent claims.

Advantages of the Invention

The invention is based on an induction heating device for a shrink-clamping and/or unshrink-unclamping of tools into and/or from tool holders, in particular of an induction heating unit of a shrink-clamping and/or unshrink-unclamping station for tools, with an induction heating unit comprising at least one induction coil which is configured to expand, by heating, at least a portion of the tool holder during a shrink-clamping and/or unshrink-unclamping process, and with at least one shielding unit which is at least configured for a shielding of an induction magnetic field generated by the induction heating unit at least substantially at least in an axial direction of the induction coil.

It is proposed that the induction heating unit and the shielding unit form structural units which can be operatively decoupled from each other and can thus be moved relative to each other at least in the axial direction. A shrink-clamping process can consequently advantageously be optimized. A position of the shielding unit relative to the induction coil and/or relative to a tool that is to be shrink-clamped can advantageously be set, as a result of which it is in particular possible to adapt an adaptation of a configuration of the induction heating device to a tool that is to be shrink-clamped or unshrink-unclamped, and/or to a tool holder. A region in which an induction magnetic field of the induction coil is to be shielded can advantageously be specified in a variable fashion.

A "tool holder" should in particular be understood to be a component which is configured for holding a tool and connecting the tool to a machine. The tool holder in particular takes the form of an interface between the tool and the machine. The tool holder preferably takes the form of a tool chuck, in particular a shrink-chuck. The tool in particular takes the form of a shank tool, preferably a rotational shank tool, for example a drill, a milling tool, a profiling tool and/or a reamer. By a "shrink-clamping of tools into and/or from tool holders" is in particular a clamping of tools in tool holders to be understood, in which a tool holder opening of the tool holder is first expanded thermally, then a tool is inserted into the tool holder opening, and wherein lastly the tool is fastened in the tool holder non-positively, in particular by friction-fit, once the tool holder has cooled down. By an "unshrink-unclamping of tools into and/or from tool holders" is in particular a releasing of tools that are fastened in tool holders non-positively, in particular by friction-fit, in which the tool holder opening of the tool holder is, in particular avoiding simultaneous heating of the tool by virtue of the shielding unit, expanded thermally until the tool that is fastened in the tool holder can be removed from the tool holder. "A shrink-clamping and/or unshrink-unclamping station for tools" is in particular to be understood as a device which is configured to perform a shrink-clamping process and/or an unshrink-unclamping process of tools in tool holders in an at least largely automated fashion and preferably in a completely automated fashion. The shrink-clamping process comprises in particular all the steps required to fasten the tool in the tool holder, in particular including inserting and/or removing the tool and the tool holder in and/or from the shrink-clamping and/or unshrink-unclamping station. The unshrink-unclamping process comprises in particular all the steps required to release the tool from the tool holder, in particular including inserting and/or removing the tool and the tool holder in and/or from the shrink-clamping and/or unshrink-unclamping station.

"At least a portion of the tool holder" is in particular to mean at least a region of the tool holder which comprises the tool holder opening of the tool holder. The shielding unit is in particular configured for a shielding of the induction magnetic field of the induction coil from the tool that is to be shrink-clamped and/or unshrink-unclamped. In particular, the shielding unit is configured to at least significantly prevent the tool from being heated during the shrink-clamping process and/or during the unshrink-unclamping process. In particular, an in particular average magnetic field strength of the induction magnetic field of the induction coil on a side of the shielding unit opposite the induction coil is reduced by at least 80%, preferably by at least 90% and preferably by at least 99% compared with an arrangement with no shielding unit. "Significantly shielding" an induction magnetic field should be understood to mean in particular shielding by at least 80%, preferably by at least 90% and preferably by at least 99% of the induction magnetic field. "Operatively" should in particular be understood to mean during operation of the induction heating device and/or the shrink-clamping and/or unshrink-unclamping station. In particular, structural units which can be operatively decoupled from each other are capable of being decoupled from each other in a state when they are fitted in the shrink-clamping and/or unshrink-unclamping station and/or in a state in which they are ready to be used. In particular, structural units which can be decoupled from each other during operation form structural units which implemented in such a way that they are at least partially separate from each other, preferably structural units which are implemented to be completely separate. Advantageously it is possible to completely operatively decouple the induction heating unit and the shielding unit from each other. In particular, a movement of the induction heating unit is decoupled from a movement of the shielding unit. In particular, the movement of the shielding unit is decoupled from the movement of the induction heating unit. In particular, the axial direction in an operation-ready state of the induction heating device, in particular of the shrink-clamping and/or unshrink-unclamping with the induction heating device, takes the form of a vertical axis. In particular, the vertical axis extends, in the mounted position of the induction heating device, in particular of the shrink-clamping and/or unshrink-unclamping station with the induction heating device, perpendicular to a positioning surface on which the induction heating device, in particular of the shrink-clamping and/or unshrink-unclamping station with the induction heating device, is mounted. In particular, the axial direction extends parallel to the vertical axis. In particular, the induction heating device is configured to determine a diameter of a tool holder, for example by means of determining an inductance of the induction coil and/or by means of determining a coil current of the induction coil of an induction heating unit placed on a tool holder.

It is moreover proposed that the shielding unit at the same time forms a tool gripper unit which is configured to insert a tool into the tool holder and/or remove it from the tool holder. A shrink-clamping process can advantageously be optimized as a result. In particular, a time gap between a heating of the tool holder and an insertion and/or removal of the tool into and/or from the tool holder can be kept particularly short, as a result of which a speed of the shrink-clamping process can advantageously be increased. This is in particular due to the fact that it is advantageously possible to omit the removal of the induction heating unit and/or the shielding unit from a proximity of the tool and/or the tool holder before the tool is gripped in order to make a designated gripping region of the tool accessible by a tool gripper. In particular, it is consequently possible during unshrink-unclamping to maintain the heating of the tool, for example by heat transmission from the tool holder to the tool, at a particularly low level, as a result of which removal of the tool can advantageously be simplified or accelerated. In particular, it is consequently possible during shrink-clamping to maintain the application of heat to the tool holder at a particularly low level, in particular because a cooling-off period between heating up the tool holder and inserting the tool into the heated-up tool holder can be kept particularly short, as a result of which it is advantageously possible to accelerate the insertion of the tool and/or the energy consumption can advantageously be reduced. In addition, it is consequently advantageously possible to achieve a particularly compact structure of a shrink-clamping and/or unshrink-unclamping station because it is in particular possible to omit a separate tool gripper for inserting and/or removing the tool during the shrink-clamping and/or unshrink-unclamping process. Moreover, it is advantageously possible to keep constant an axial orientation of the tool gripper unit relative to other structural units of a shrink-clamping and/or unshrink-unclamping station, for example relative to a holding device for tool holders and/or relative to a measuring device during all operating states of the shrink-clamping and/or unshrink-unclamping station. A particularly high degree of accuracy can advantageously be achieved as a result. In contrast, in particular a tool gripper unit, which needs to be moved away to one side in order to make space for an induction heating device and/or for a shielding unit, must be oriented each time axially relative to the respective tool holder at the expense of accuracy and speed. The tool gripper unit is in particular configured for gripping the tool. In particular, the tool gripper unit is configured to move the tool relative to the axial direction of the induction coil. In particular, the tool gripper unit is configured to move the tool relative to the axial direction of the tool holder. In particular, the tool gripper unit is configured to move the tool parallel to a movement axis of the induction heating unit, preferably along a movement axis of the induction heating unit.

It is furthermore proposed that the shielding unit comprises an arrangement of movably supported shielding elements. Safe and/or efficient gripping of tools can consequently advantageously be enabled. In addition, gripping of tools with different diameters, in particular shaft diameters, can advantageously be enabled. Furthermore, a particularly efficient shielding of the induction magnetic field can advantageously be achieved at the same time. In particular, the shielding unit comprises at least two, preferably at least four, preferably at least six and particularly preferably at least eight shielding elements which are supported so that they can move relative to one another. In particular, the shielding elements are supported so that they can move relative to each other in a common plane.

It is moreover proposed that the movably supported shielding elements at least partially form a tool gripper of the tool gripper unit. Safe and/or efficient gripping of tools can consequently advantageously be achieved. In addition, gripping of tools with different diameters, in particular different shank diameters, can advantageously be enabled. In particular, the movably supported shielding elements are configured to contact the tool along its circumference. In particular, the movably supported shielding elements are configured to exert on the tool a force, acting along the circumference of the tool, which in particular causes the tool to be gripped. In particular, the induction heating device has a bearing mechanism. In particular, the movably supported shielding elements can be moved by means of the bearing mechanism, in particular in an automated fashion. The bearing mechanism is preferably configured to move the movably supported shielding elements hydraulically, pneumatically and/or by means of servomotor. In particular, the movably supported shielding elements can be moved at least perpendicular to the axial direction. In particular, the bearing mechanism is configured to move the movably supported shielding elements in such a way that a tool can be gripped by means of the shielding elements.

It is additionally proposed that the movably supported shielding elements are displaceable relative to each other in such a way that they form an at least substantially is closed shielding plane with a variable opening for receiving tools, in particular tool shanks, preferably with different diameters. Safe and/or efficient gripping of tools with different diameters, in particular shaft diameters, can consequently advantageously be achieved. Furthermore, particularly efficient shielding of the induction magnetic field can advantageously be achieved at the same time. In particular, the shielding plane extends perpendicular to the axial direction. In particular, the shielding elements bear against each other and/or in part mutually overlap each other. In particular, the shielding elements are arranged around a centre of the shielding unit. In particular, a diameter of the variable opening in a maximally open state is at least 80 mm, preferably at least 65 mm, preferably at least 50 mm and particularly preferably at least 40 mm. It can consequently advantageously be ensured that the shielding unit and the tool gripper unit respectively can be moved over tools with large and/or protruding machining elements, in particular cutting edges. In particular, the diameter of the variable opening is in the maximally open state no more than 80 mm, preferably no more than 50 mm. In particular, a smallest possible diameter of the variable opening in a maximally closed state is no more than 3 mm, preferably no more than 2 mm and preferably no more than 1 mm. The variable opening in the maximally closed state is particularly preferably completely closed.

In addition, it is proposed that the movably supported shielding elements form blades of a bladed shutter or slide elements which are displaceable at least perpendicularly to the axial direction. Particularly advantageous gripping of tools during shielding which is at the same time particularly advantageous can consequently be enabled. In particular, the blades of the bladed shutter are arranged in a similar fashion to an iris diaphragm and/or a central shutter of a camera and can be moved relative to each other. In particular, the bladed shutter comprises multiple, for example four, five, six, seven or eight blades which can preferably be rotated together inwards or outwards by means of a mechanism. In particular, each blade is here supported on a pivot. All the blades are preferably connected to each other via a ring element which is configured to generate and/or control a common movement of the blades. In particular, the slide element has the form of a rectangle, a wedge or a prism. It is, for example, conceivable that the slide elements take the form of two prismatic jaws which can be slid at least partially over each other and hence, in a state in which a tool is gripped, generate a central prismatic opening of variable size for receiving the tool.

It is furthermore proposed that at least one of the slide elements forming the tool gripper unit, preferably at least multiple slide elements forming the tool gripper unit, forms a roller element or has a roller element. In particular, the roller element is designed so that it can be rotated. In particular, the roller element can be rotated in a controlled fashion by means of a drive mechanism. In particular, the roller element is configured to rotate a tool gripped by the tool gripper unit, in particular about a designated axis of rotation of the tool. In particular, the roller element can be rotated about an axis of rotation which extends parallel to the axial direction, in particular parallel to an axis of rotation of a tool gripped by the tool gripper unit. A particularly accurate positioning of the tool by the tool gripper unit can consequently advantageously be enabled, as a result of which in particular particularly precise measurement of the tool and/or adjustment of the tool can be enabled, in particular of the length of the tool relative to the tool holder.

If the shielding elements are implemented at least largely from a soft magnetic, essentially electrically non-conductive material, for example from soft magnetic ferrite, particularly effective magnetic field shielding can advantageously be achieved. "Largely" should be understood to mean in particular at least 75%, preferably at least 85%, advantageously at least 95% and preferably at least 99%. A "soft magnetic material" should be understood to mean in particular a material which can be magnetized easily. In particular, a soft magnetic material has a coercive field strength of no more than 1000 Nm, preferably no more than 700 Nm, advantageously no more than 500 Nm, particularly advantageously no more than 300 A/m, preferably no more than 100 Nm and particularly preferably no more than 50 Nm. An "essentially electrically non-conductive material" should be understood to mean in particular a material with a specific resistance greater than 10 Ωcm, preferably greater than 100 Ωcm, preferably greater than 1000 Ωcm and particularly preferably greater than 10,000 Ωcm. The soft magnetic ferrite in particular takes the form of MnZn ferrite or preferably NiZn ferrite.

A method is moreover proposed with the induction heating device, the shielding unit of which at the same time forms a tool gripper unit that is configured to insert a tool into the tool holder and/or remove a tool from the tool holder, wherein, in an operating state in which the induction heating unit is placed on the tool holder, the tool inserted in the tool holder is gripped by the tool gripper unit in a proximity of a tool holder opening of the tool holder. A shrink-clamping process can consequently advantageously be optimized. In particular, a time gap between heating the tool holder and inserting and/or removing the tool into and/or from the tool holder can be kept particularly short, as a result of which a speed of the shrink-clamping process can advantageously be increased. A "proximity" should is in particular to mean, in this context, a region of the tool, in particular of the tool shank, which is formed of points having a maximum distance from the tool holder opening of 10 mm, preferably of 6 mm, advantageously of 4 mm, preferably of 3 mm and particularly preferably of 2 mm. In particular, the tool is gripped by the tool gripper unit in a region close to the tool holder opening whilst the induction coil is placed on the tool holder.

A method is moreover proposed with an induction heating device, the shielding unit of which comprises an arrangement of movably supported shielding elements, wherein the movably supported shielding elements of the shielding unit are used in order to grip a tool, in particular a tool shank. A shrink-clamping process can consequently advantageously be optimized. In particular, a time gap between heating the tool holder and inserting and/or removing the tool into and/or from the tool holder can be kept particularly short, as a result of which the speed of the shrink-clamping process can advantageously be increased. In addition, it is advantageously possible to omit an additional separate tool gripper unit, as a result of which in particular costs and/or the required structural space can be reduced.

In addition a shrink-clamping and/or unshrink-unclamping station for tools is proposed, for an at least largely automated shrink-clamping and/or unshrink-unclamping of tools into and/or from tool holders, with a tool gripper unit that is configured to insert a tool into a tool holder for the purpose of performing a shrink-clamping process and/or to remove a tool from a tool holder for the purpose of performing an unshrink-unclamping process, and with a holding device for a tool holder, wherein a relative positioning of the tool gripper unit and of the holding device relative to each other, apart from the relative positioning in a common axial direction of the tool gripper unit and the holding device, in particular along the vertical axis of the shrink-clamping and/or unshrink-unclamping station, is at least substantially constant during the whole shrink-clamping process and/or during the whole unshrink-unclamping process. A shrink-clamping process can consequently advantageously be optimized. In particular, a particularly high degree of axial accuracy can be achieved, in particular during insertion of a tool in a tool holder and/or during removal of the tool from the tool holder. In addition, the speed of the shrink-clamping process can advantageously be increased. In particular, the tool gripper unit can be moved relative to the holding device, in particular during the whole shrink-clamping process and/or during the whole unshrink-unclamping process, exclusively in an axial direction, in particular along the vertical axis. In particular, the tool gripper unit is moved, during the whole shrink-clamping process and/or during the whole unshrink-unclamping process, exclusively in an axial direction, in particular along the vertical axis. In particular, the tool gripper unit cannot be moved in a direction perpendicular to the axial direction, in particular perpendicular to the vertical axis. The tool gripper unit in particular has a tool gripper axis which preferably extends perpendicular to the shielding plane formed by the shielding elements of the tool gripper unit and centrally through the variable opening formed by the shielding elements. The holding device in particular has an axis of rotation. In particular, the axis of rotation of the holding device and the holding axis of the tool gripper unit overlap during the whole shrink-clamping process and/or during the whole unshrink-unclamping process. "In a largely automated fashion" should be understood to mean that, with the exception of the insertion of the tool and/or the tool holder into the shrink-clamping and/or unshrink-unclamping station and/or with the exception of the removal of the tool and/or the tool holder from the shrink-clamping and/or unshrink-unclamping station, all work steps proceed independently of an operator. In addition, it can be envisaged that the insertion and/or the removal of the tool and/or the tool holder is also automated, for example with the aid of an industrial robot. A "positioning" can in particular also be understood to mean a position.

The holding device in particular comprises a spindle unit. The spindle unit is in particular designed so that it can rotate. The spindle unit can in particular rotate about an axis of rotation which extends parallel to the axial direction. The axis of rotation of the spindle unit is in particular designed so that it is identical to the axis of rotation of the holding device. The axis of rotation of the spindle unit is in particular identical to axes of rotation of tools held in the holding device. The holding device in particular comprises an attachment holder. The attachment holder can in particular be fastened in the spindle unit so that it is at least fixed in rotation, preferably fixed in translation. The attachment holder is in particular implemented to be exchangeable. Each attachment holder is in particular configured to form a receiving element for at least one specific tool holder and/or for at least one specific complete tool. Different attachment holders are associated in particular with different tool holders and/or complete tools. The shrink-clamping process in particular comprises all the work steps of the shrink-clamping and/or unshrink-unclamping station from insertion of a tool into the shrink-clamping and/or unshrink-unclamping station up to successful fastening of the tool in the tool holder. The unshrink-unclamping process in particular comprises all the work steps of the shrink-clamping and/or unshrink-unclamping station from insertion of a tool holder in which a tool is fastened into the shrink-clamping and/or unshrink-unclamping station up to successful removal of the tool from the tool holder. By a "substantially constant positioning" is in particular to be understood, in this context, that movements of the tool gripper unit are free of components in a direction perpendicular to the axial direction, in particular perpendicular to the vertical direction, which exceed tolerances which are to be expected, for example tolerances for play. "Configured" should in particular be understood to mean specially programmed, designed and/or equipped. An object being provided for a specific function should in particular mean that the object fulfils and/or performs this specific function in at least one application and/or operating state.

It is moreover proposed that the shrink-clamping and/or unshrink-unclamping station has an induction heating unit, wherein a relative positioning of the tool gripper unit and/or of a length-adjustment unit of the shrink-clamping and/or unshrink-unclamping station relative to each other, apart from the relative positioning in a common axial direction of the tool gripper unit and the induction heating unit and/or the length-adjustment unit is at least substantially constant during the whole shrink-clamping process and/or during the whole unshrink-unclamping process. A shrink-clamping process can consequently advantageously be optimized. In particular, a particularly high degree of axial accuracy can be achieved, in particular during insertion of a tool in a tool holder and/or during removal of the tool from the tool holder. In addition, the speed of the shrink-clamping process can advantageously be increased. In particular, the tool gripper unit can be moved relative to the induction heating unit and/or to a length-adjustment unit, in particular during the whole shrink-clamping process and/or during the whole unshrink-unclamping process, exclusively in an axial direction, in particular along the vertical axis. In particular, the induction heating unit is moved, during the whole shrink-clamping process and/or during the whole unshrink-unclamping process, exclusively in an axial direction, in particular along the vertical axis. In particular, the induction heating unit cannot be moved in a direction perpendicular to the axial direction, in particular perpendicular to the vertical axis.

The induction coil of the induction heating unit in particular has a coil axis which preferably extends along the inside of coil windings of the induction coil. In particular, the holding axis of the tool gripper unit and the coil axis overlap during the whole shrink-clamping process and/or during the whole unshrink-unclamping process.

It is furthermore proposed that the shrink-clamping and/or unshrink-unclamping station has a driveshaft which is configured to couple with the tool gripper unit and with the induction heating unit for the purpose of an independent adjustment of the axial positions of the induction heating unit and of the tool gripper unit. A shrink-clamping process can consequently advantageously be optimized. In particular, a particularly high degree of axial accuracy can be achieved. In addition, the speed of the shrink-clamping process can advantageously be increased. Moreover, a space-saving and/or cost-saving structure of the shrink-clamping and/or unshrink-unclamping station can advantageously be achieved. In particular, the shrink-clamping and/or unshrink-unclamping station has at least one position-determination system which is configured to determine a position of the induction heating unit and/or the tool gripper unit on the driveshaft. It is of course alternatively also conceivable that at least one component is moved by a separate drive, in particular a separate driveshaft, or that all the components have separate drives, in particular separate driveshafts.

It is proposed in addition that the induction heating unit and the tool gripper unit can respectively be coupled with the driveshaft via a rolling ring drive. A shrink-clamping process can consequently advantageously be optimized. In particular, a particularly high degree of axial accuracy can advantageously be achieved. In addition, the speed of the shrink-clamping process can advantageously be increased. Moreover, a space-saving and/or cost-saving structure of the shrink-clamping and/or unshrink-unclamping station can advantageously be achieved. In particular, the induction heating unit and the tool gripper unit can each be moved by means of an Uhing drive, wherein the Uhing drive of the induction heating unit and the Uhing drive of the tool gripper unit preferably have a common driveshaft.

The rolling ring drive in particular comprises a Uhing drive nut for each separately movable component. In particular, the rolling ring drive associated with the tool gripper unit, in particular the Uhing drive nut of the rolling ring drive associated with the tool gripper unit, is optionally coupled with the driveshaft or uncoupled from the driveshaft. In particular, the rolling ring drive associated with the induction heating unit, in particular the Uhing drive nut of the rolling ring drive associated with the induction heating unit, is optionally coupled with the driveshaft or uncoupled from the driveshaft. The rolling ring drive, in particular the respective Uhing drive nut, is in particular coupled and/or uncoupled by means of pneumatically acting on the rolling ring drive, in particular on the respective Uhing drive nut.

It is furthermore proposed that the shielding unit and the tool gripper unit are implemented at least partially integrally with each other. A shrink-clamping process can consequently advantageously be optimized. A speed and/or an efficiency of the shrink-clamping process can advantageously be increased. In addition, a space-saving and/or cost-saving structure of the shrink-clamping and/or unshrink-unclamping station is advantageously achievable. In particular, at least one shielding element, preferably the shielding elements, forms gripper elements of the tool gripper unit. By two units being implemented "partially integrally with each other" is in particular to be understood that the units have at least one, in particular at least two, advantageously at least three common elements which are a component, in particular a functionally important component, of both units.

It is additionally proposed that the shrink-clamping and/or unshrink-unclamping station has a length-adjustment unit which is configured to adjust a length of a tool during the shrink-clamping process, in particular with the assistance of the tool gripper unit. A shrink-clamping process can consequently advantageously be optimized. A high degree of precision and/or a high degree of efficiency of the shrink-clamping and/or unshrink-unclamping station can advantageously be achieved. "Adjusting a length" should in particular mean adjusting a total length of the tool holder with the tool fastened therein and/or adjusting an insertion depth of the tool in the tool holder opening of the tool holder. The length-adjustment unit is in particular configured to determine at least the length of a tool which is moved by means of the tool gripper unit between measurement points of the length-adjustment unit. The length-adjustment unit is in particular configured to determine at least one position of the tool holder, in particular of the tool holder opening of the tool holder, in particular in the axial direction. In particular, the shrink-clamping and/or unshrink-unclamping station has at least one control and/or regulating unit. The control and/or regulating unit is in particular at least configured to control a length adjustment and/or length determination of the length-adjustment unit. In particular, the control and/or regulating unit at least configured to control a movement of the tool gripper unit, in particular of the gripper elements of the tool gripper unit, of the induction heating unit and/or of the holding device. A "control and/or regulating unit" should be understood to mean in particular a unit with at least one electronic control system. An "electronic control system" should be understood in particular to mean a unit with a processor unit and with a memory unit, and with an operating program saved in the memory unit.

It is furthermore proposed that the length-adjustment unit has at least one, in particular optical and/or tactile sensor unit which is arranged in an axial movement direction of the tool gripper unit and which is configured for a determination of a reference length of a tool that is to be shrink-clamped. A shrink-clamping process can consequently advantageously be optimized. A high degree of precision and/or a high degree of efficiency of the shrink-clamping and/or unshrink-unclamping station can advantageously be achieved. Simple length adjustment can advantageously be enabled. The sensor unit in particular takes the form of a light barrier, for example a laser light barrier. The sensor unit alternatively takes the form of a force transducer, for example a tactile load cell, which is preferably configured to emit a measurement signal to the control and/or regulating unit when a contact, in particular of the tool with the force transducer, is registered. In particular, the sensor unit is arranged fixed in position in the axial direction, in particular along the vertical axis, of the shrink-clamping and unshrink-unclamping station. In particular, the sensor unit is implemented separately from the tool gripper unit and/or from the induction heating unit. In particular, the tool gripper unit is configured to move a tool gripped by the tool gripper unit into a measurement range of the sensor unit. In particular, the control and/or regulating unit is configured to determine a length of the tool from an axial position of the tool gripper unit at a point in time at which a measurement signal is registered by the sensor unit.

It is additionally proposed that the length-adjustment unit has a further, in particular optical sensor unit which is fixedly coupled with the induction heating unit in an operation-ready state. A shrink-clamping process can consequently advantageously be optimized. A high degree of precision and/or a high degree of efficiency of the shrink-clamping and/or unshrink-unclamping station can advantageously be achieved. The length of the tool holder and/or the length of a length-adjustment pin of the shrink-clamping and/or unshrink-unclamping station can consequently advantageously be calculated. A high degree of process reliability can advantageously be achieved. In particular, the further sensor unit takes the form of a light barrier, preferably a laser light barrier. The further sensor unit is in particular arranged below the induction heating unit. The further sensor unit is in particular coupled to the induction heating unit in such a way that the further sensor unit follows movements of the induction heating unit. In particular, the further sensor unit has a measurement range with a diameter which corresponds to at least a maximum diameter of a tool holder opening of the induction heating unit, in particular of the induction coil, or is greater than the maximum diameter of the tool holder opening of the induction heating unit. It is conceivable that, in particular by means of measurement data of the further sensor unit and/or by means of measurement data of the tool holder diameter determination by the induction heating unit, the shrink-clamping and/or unshrink-unclamping station is configured to automatically determine a tool holder type.

A method is moreover proposed with a shrink-clamping and/or unshrink-unclamping station having at least the induction heating unit, the holding device for tool holders and the tool gripper unit. A shrink-clamping process can consequently advantageously be optimized.

If, during the whole shrink-clamping process and/or during the whole unshrink-unclamping process, the tool gripper unit is traversed exclusively along a single axis, in particular exclusively along a designated axis of rotation of the tool that is to be shrink-clamped and/or unshrink-unclamped, preferably exclusively along the vertical axis, a shrink-clamping process can advantageously be optimized. In particular, a particularly high degree of axial accuracy can be achieved, in particular during insertion of a tool in a tool holder and/or during removal of the tool from the tool holder. In addition, a speed of the shrink-clamping process can advantageously be increased. In addition, the induction heating unit is preferably also traversed exclusively along the same single axis, in particular exclusively along the designated axis of rotation of the tool that is to be shrink-clamped and/or unshrink-unclamped, preferably exclusively along the vertical axis, during the whole shrink-clamping process, and/or during the whole unshrink-unclamping process. In particular, during the whole shrink-clamping process and/or during the whole unshrink-unclamping process, the tool gripper unit and/or the induction heating unit are not traversed in a direction that is perpendicular to the single axis, in particular not in a direction that is perpendicular to the designated axis of rotation of the tool that is to be shrink-clamped and/or unshrink-unclamped, preferably not in a direction that is perpendicular to the vertical axis. In particular, the holding device and/or the tool holder inserted in the holding device is not moved in translation during the whole shrink-clamping process and/or during the whole unshrink-unclamping process.

A method is moreover proposed for a shrink-clamping of a tool into a tool holder by means of the shrink-clamping and/or unshrink-unclamping station. A shrink-clamping process can consequently advantageously be optimized.

If in at least one length adjustment step of the method for shrink-clamping the tool into the tool holder, for a determination of a designated shrink-on and/or clamping depth of the tool, the tool is placed on the still unexpanded tool holder, and the tool is subsequently moved in the axial direction, in particular of the tool, until a tip of the tool is captured by an, in particular optical or tactile, sensor unit, a simple and/or effective length adjustment of the tool in the tool holder is advantageously achievable. The control and/or adjustment unit can advantageously determine a length of the tool from the relative position of the tool gripper, relative to a position of the holding device, when the tip of the tool is by the sensor unit and when the tool is placed on the unexpanded tool holder, in particular with knowledge of a tool holder type. In addition, in the event of a prior measurement of the tool holder, the length of the tool can advantageously be calculated by the further sensor unit, even when the position of the holding device is not known precisely and/or even when the tool holder type is not known precisely. A "shrink-on and/or clamping depth" should be understood to mean in particular that length of the shank of a tool which is situated inside the tool holder opening of the tool holder in a state in which the tool is fastened in the tool holder.

A method is in addition proposed for an unshrink-unclamping of a tool from a tool holder by means of the shrink-clamping and/or unshrink-unclamping station. A shrink-clamping process can consequently advantageously be optimized.

If, in at least one tool removal step of the method for an unshrink-unclamping of the tool in the tool holder as early as during a heating-up phase of an unshrink-unclamping process in which a tool holder is expanded by inductive heating, a pulling removal force is exerted on the tool by means of a tool gripper unit of the shrink-clamping and/or unshrink-unclamping station, particularly rapid removal of the tool from the tool holder can advantageously be achieved. An unshrink-unclamping process can consequently advantageously be implemented more efficiently, in particular by being able to minimize the application of energy to the tool holder during the unshrink-unclamping process. In addition, heating and associated analogous expanding of the tool during the unshrink-unclamping process can advantageously be avoided, as a result of which a particularly high unshrink-unclamping success rate can advantageously be achieved. By means of the method described, the tool is advantageously released from the tool holder immediately after the tool holder opening of the tool holder has undergone sufficient expanding that the tool can be extracted from the tool holder opening of the tool holder by means of the force applied by the tool gripper unit. Transfer of the heat generated by the induction heating unit from the tool holder to the tool is consequently advantageously substantially prevented.

The induction heating device according to the invention, the shrink-clamping and/or unshrink-unclamping station according to the invention and the method according to the invention are herein not to be limited to the above-described application and embodiment. In particular, the induction heating device according to the invention, the shrink-clamping and/or unshrink-unclamping station according to the invention and the method according to the invention can, in order to fulfil a functionality described here, have a number of individual elements, components and units differing from the number mentioned here.

DRAWINGS

Other advantages result from the following description of the drawings, in which four exemplary embodiments of the invention are shown. The drawings, the description and the claims contain numerous features in combination. A person skilled in the art will expediently also be able to consider the features individually and combine them in meaningful further combinations.

Figure 2:
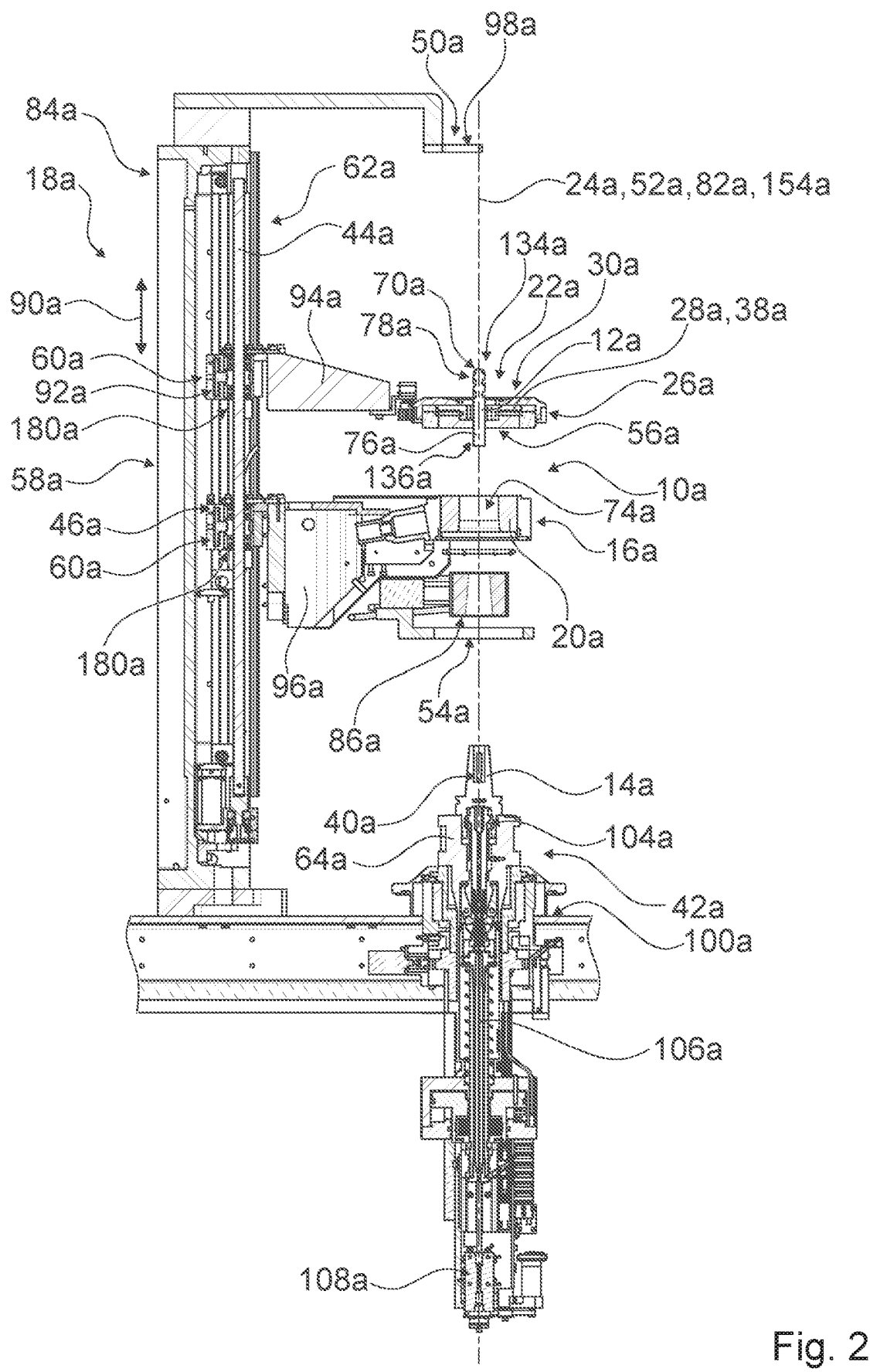
Figure 3:
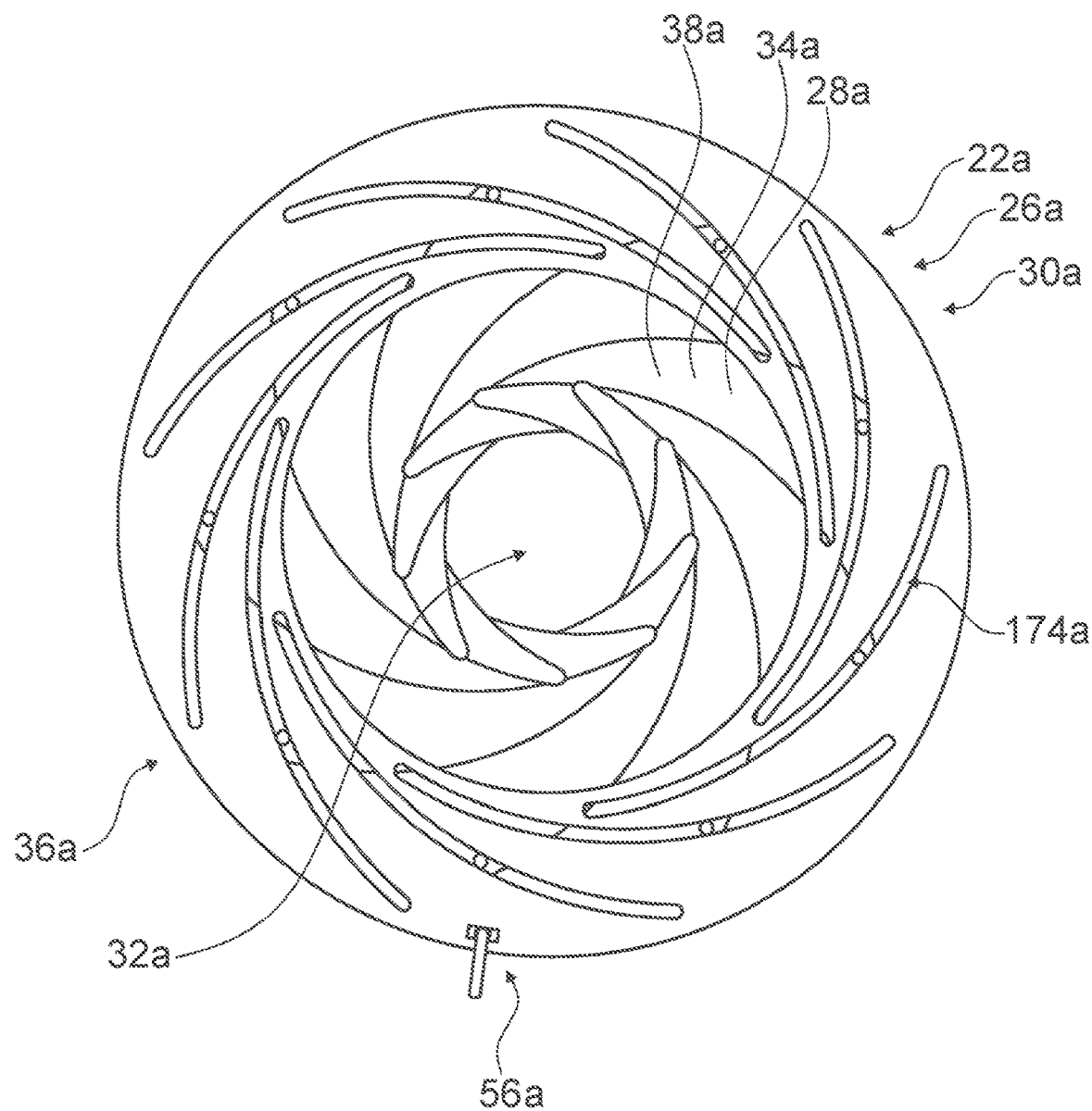
Figure 4:
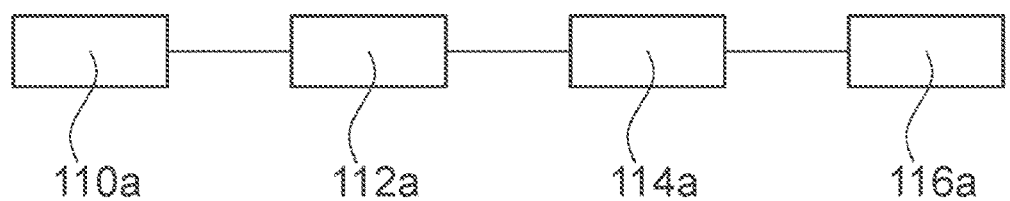
Figure 5:
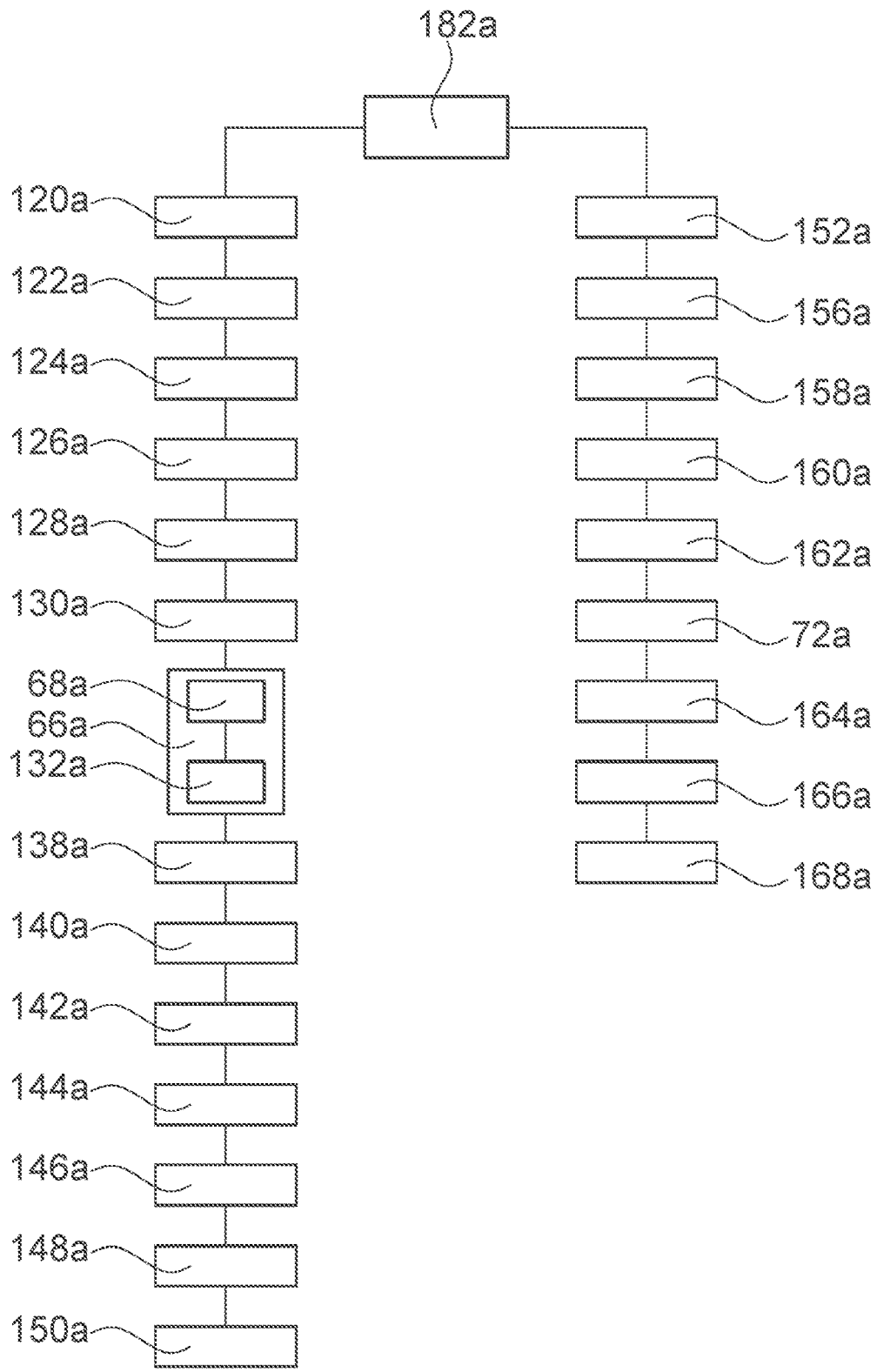
Figure 6:
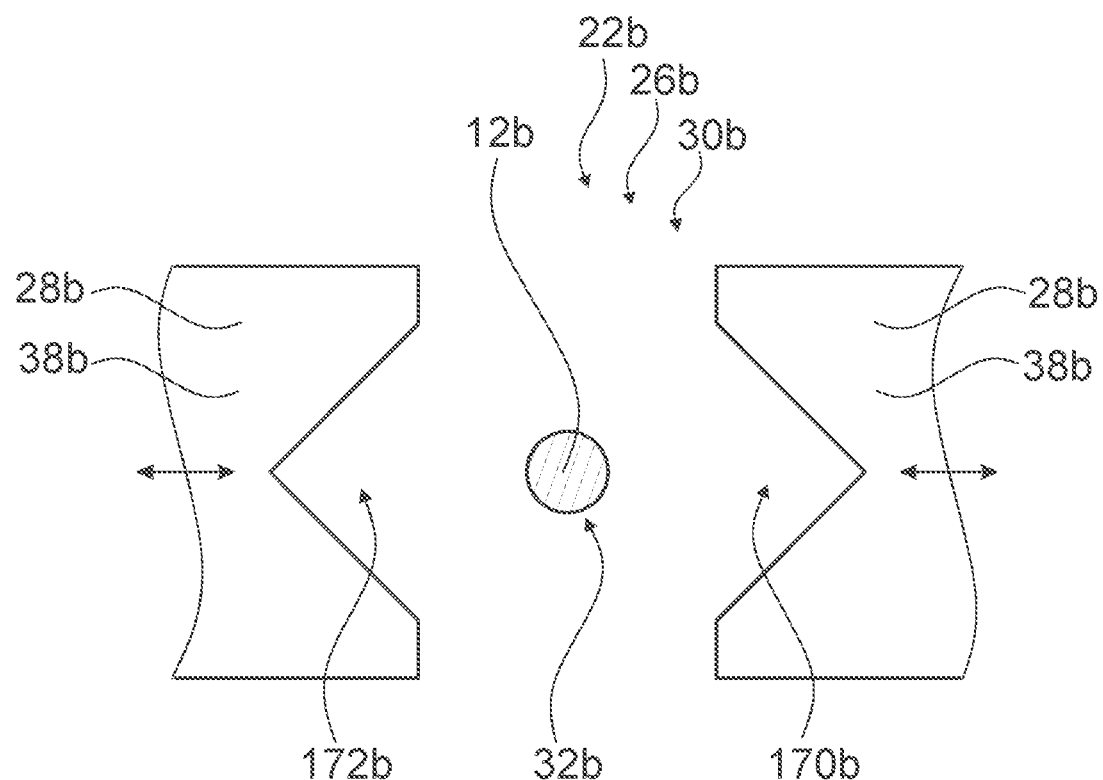
Figure 7:
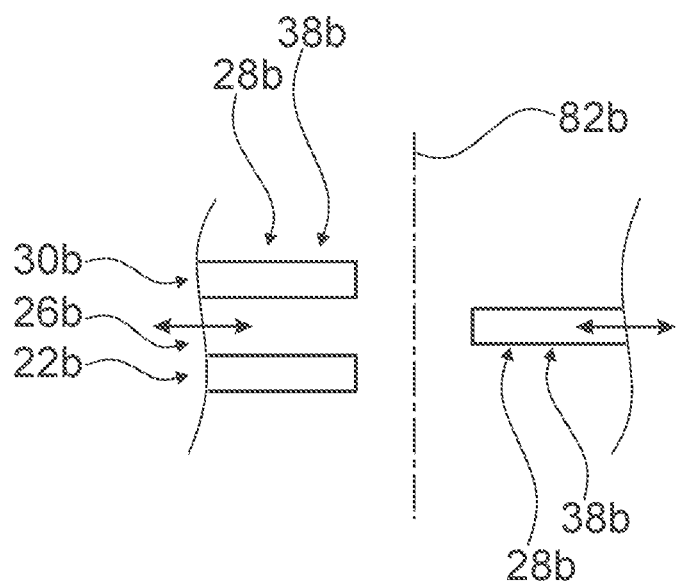
Figure 8:
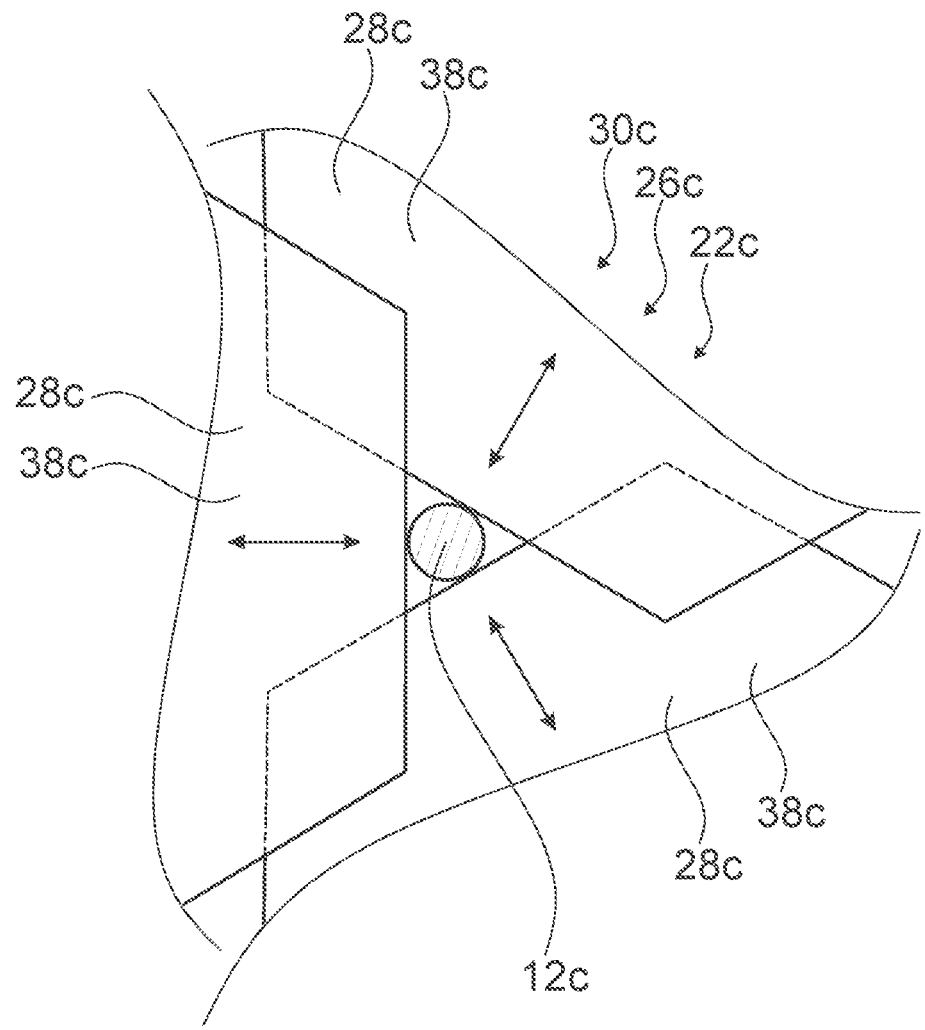
Figure 9:
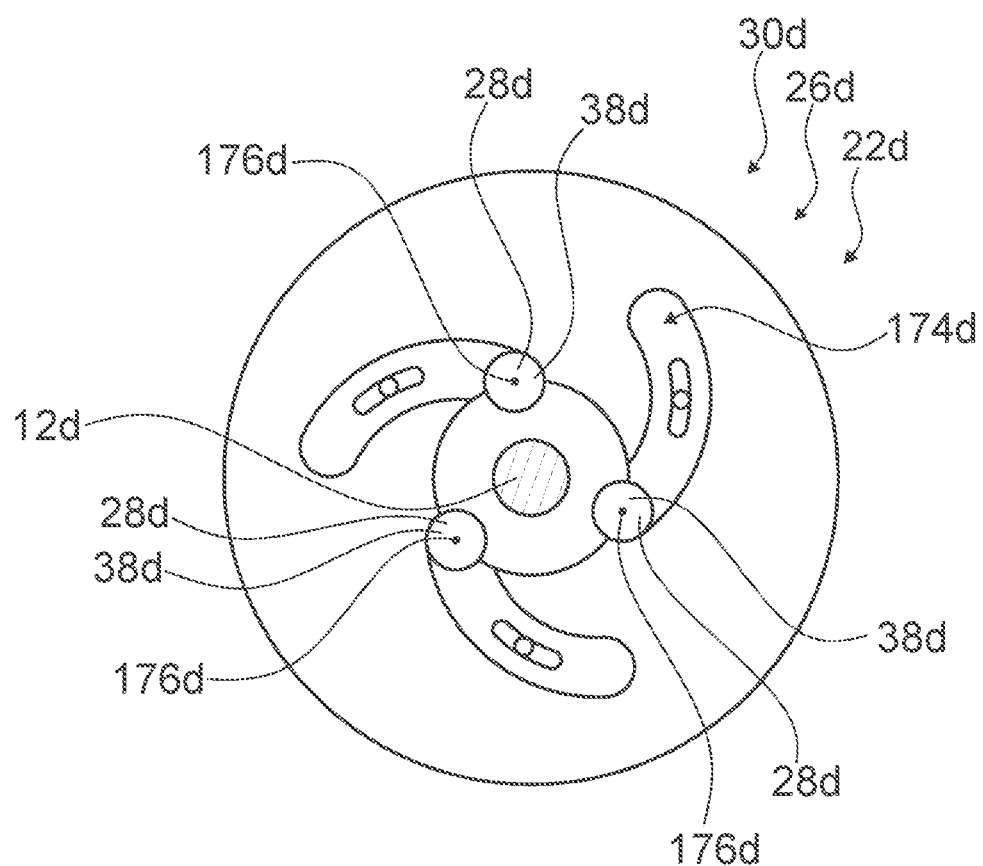
Figure 10:
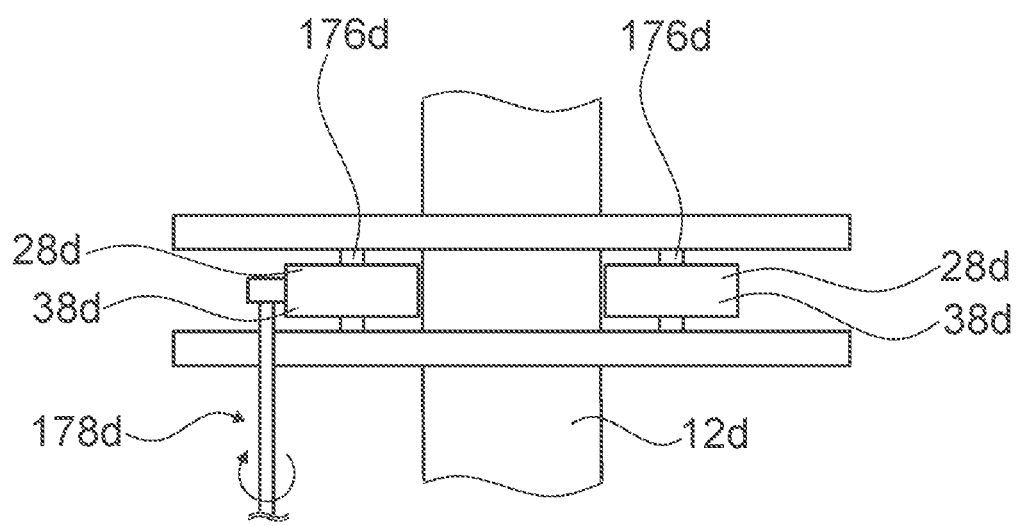

In the drawings:

FIG. 1 shows a schematic, perspective view of a shrink-clamping and/or unshrink-unclamping station with an induction heating device, FIG. 2 shows a schematic side view of the shrink-clamping and/or unshrink-unclamping station with the induction heating device, FIG. 3 shows a schematic plan view of part of a shielding unit, forming a tool gripper unit, of the induction heating device, FIG. 4 shows a schematic flow diagram of a method with the induction heating device, FIG. 5 shows a schematic flow diagram of a method with the shrink-clamping and/or unshrink-unclamping station for a shrink-clamping of a tool into a tool holder and for an unshrink-unclamping of a tool from a tool holder, FIG. 6 shows a schematic plan view of part of an alternative shielding unit, forming an alternative tool gripper unit, of an alternative induction heating device, FIG. 7 shows a schematic side view of part of the alternative shielding unit forming the alternative tool gripper unit, FIG. 8 shows a schematic plan view of part of a second alternative shielding unit, forming a second alternative tool gripper unit, of a second alternative induction heating device, FIG. 9 shows a schematic plan view of part of a third alternative shielding unit, forming a third alternative tool gripper unit, of a third alternative induction heating device, and FIG. 10 shows a schematic side view of part of the third alternative shielding unit forming the third alternative tool gripper unit.

DESCRIPTION OF THE EXEMPLARY EMBODIMENTS

FIG. 1 shows a shrink-clamping and/or unshrink-unclamping station 18a. The shrink-clamping and/or unshrink-unclamping station 18a is configured for an automated shrink-clamping and/or unshrink-unclamping of tools into and/or from tool holders 14a. The shrink-clamping and/or unshrink-unclamping station 18a is configured for performing a shrink-clamping process on tools 12a for the purpose of fastening the tools 12a in tool holders 14a and/or for performing an unshrink-unclamping process on tools 12a for the purpose of removing the tools 12a from tool holders 14a. The shrink-clamping and/or unshrink-unclamping station 18a has an induction heating device 10a. The induction heating device 10a is configured for heating the tool holders 14a. The tool holders 14a take the form of shrink-chucks. The tool holders 14a have tool holder openings 40a. The tools 12a take the form of shank tools. The tools 12a have a tool shank 76a. The tools 12a have a working region 78a. The tool holder openings 40a of the tool holders 14a are configured to receive the tool shank 76a of a tool 12a. In a state where it is clamped in the tool holder 14a, the tool shank 76a is preferably inserted into the tool holder opening 40a of the tool holder 14a almost completely, in particular as far as a region measuring no more than 5 mm, preferably no more than 3 mm, preferably no more than 2 mm.

The induction heating device 10a has an induction heating unit 16a. The induction heating unit 16a is configured to expand, by heating, the tool holder opening 40a of the tool holder 14a during the shrink-clamping process and/or during the unshrink-unclamping process. The induction heating unit 16a has an induction coil 20a. The induction heating unit 16a is configured to generate an induction magnetic field. The induction magnetic field is configured to interact with the material of the tool holder 14a for the purpose of heating and hence expanding the tool holder 14a. The induction coil 20a has an opening 74a. The opening 74a of the induction coil 20a is oriented parallel to an axial direction 24a of the shrink-clamping and/or unshrink-unclamping station 18a. The induction coil 20a comprises coil windings which are wound around the opening 74a of the induction coil 20a. The shrink-clamping and/or unshrink-unclamping station 18a has a control and/or regulating unit 80a. The control and/or regulating unit 80a is at least configured to apply alternating current to the induction coil 20a for the purpose of generating an induction magnetic field. The induction heating unit 16a comprises a cooling unit 86a. The cooling unit 86a is arranged below the induction coil 20a. The cooling unit 86a is configured to cool the tool holder 14a following the insertion of a tool 12a into the holder 14a and/or following the removal of a tool 12a from the tool holder 14a.

The induction heating device 10a has a shielding unit 22a. The shielding unit 22a is configured to shield the induction magnetic field generated by the induction heating unit 16a at least in an axial direction 24a of the induction coil 20a. The axial direction 24a of the induction coil 20a extends along a centre of the opening 74a of the induction coil 20a. The axial direction 24a of the induction coil 20a corresponds to an axial direction 24a of the shielding unit 22a. The axial direction 24a of the induction coil 20a corresponds to an axial direction 24a of a tool holder 14a positioned in the shrink-clamping and/or unshrink-unclamping station 18a. The axial direction 24a of the induction coil 20a corresponds to an axial direction 24a of a tool 12a fastened in a tool holder 14a positioned in the shrink-clamping and/or unshrink-unclamping station 18a. The shielding unit 22a is arranged along a vertical axis 82a of the shrink-clamping and/or unshrink-unclamping station 18a above the induction heating unit 16a. The shielding unit 22a is configured to shield the induction magnetic field of the induction heating unit 16a from above in the direction of the vertical axis 82a.

The shielding unit 22a comprises an arrangement of movably supported shielding elements 28a. The movably supported shielding elements 28a can be moved relative to each other in such a way that they can as far as possible completely enclose the tool shank 76a of a tool 12a and can thus generate the highest possible degree of shielding. The movably supported shielding elements 28a are displaceable relative to each other in such a way that they form an at least substantially closed shielding plane with a variable opening 32a for receiving tools 12a with different diameters. The variable opening 32a formed by the shielding elements 28a is arranged centrally in the shielding plane, in particular the shielding unit 22a. The axial direction 24a extends centrally through the variable opening 32a formed by the shielding elements 28a. The shielding elements 28a are implemented from a soft magnetic material. The shielding elements 28a are formed from an electrically nonconductive material. The shielding elements 28a are implemented from a soft magnetic ferrite material.

The shielding unit 22a at the same time forms a tool gripper unit 26a. The shielding unit 22a and the tool gripper unit 26a are implemented integrally with each other. The tool gripper unit 26a is configured to insert a tool 12a for performing a shrink-clamping process into a tool holder 14a. The tool gripper unit 26a is configured to remove a tool 12a for performing an unshrink-unclamping process from the tool holder 14a. The tool gripper unit 26a is configured to move the tool 12a inside the shrink-clamping and/or unshrink-unclamping station 18a exclusively along the vertical axis 82a. The tool gripper unit 26a is configured to enclose the tool 12a on all sides during a gripping process. The tool gripper unit 26a is configured to grip the tool 12a by means of generating a non-positive connection.

The movably supported shielding elements 28a form a tool gripper 30a of the tool gripper unit 26a. The shielding elements 28a are configured to exert a holding force, acting perpendicular to the axial direction 24a, on a tool 12a. The movably supported shielding elements 28a can be moved in an automated fashion by means of a drive device which is not shown in detail. The control and/or regulating unit 80a is configured to control a movement of the movably supported shielding elements 28a. The induction heating device 10a has a bearing mechanism 56a. The movably supported shielding elements 28a can be moved in an automated fashion by means of the bearing mechanism 56a. The control and/or regulating unit 80a is configured to control the tool gripper unit 26a, in particular the tool gripper 30a of the tool gripper unit 26a, formed by the movably supported shielding elements 28a. The control and/or regulating unit 80a is configured to control a gripping movement of the tool gripper 30a. The movably supported shielding elements 28a form blades 34a of a bladed shutter 36a (cf. FIG. 3). The movably supported shielding elements 28a form slide elements 38a which are displaceable at least perpendicularly to the axial direction 24a. The bladed shutter 36a shown by way of example in FIG. 3 comprises nine blades 34a. Alternatively, the bladed shutter 36a can have a larger or smaller number of blades 34a. In particular, the shape of the variable opening 32a formed by the shielding elements 28a corresponds to a polygon, the number of corners of which corresponds to a blade count of the bladed shutter 36a.

The shrink-clamping and/or unshrink-unclamping station 18a has a tower unit 84a. The tower unit 84a, in particular the main direction of extent 90a of the tower unit 84a, extends parallel to the vertical axis 82a of the shrink-clamping and/or unshrink-unclamping station 18a. The shielding unit 22a is supported movably on the tower unit 84a. The shielding unit 22a comprises a carriage 94a. The carriage 94a of the shielding unit 22a is configured for movably supporting the shielding unit 22a on the tower unit 84a. The shielding unit 22a preferably comprises at least two carriages 94a, as a result of which a particularly high degree of precision in the movement of the shielding unit 22a can advantageously be achieved. The shielding unit 22a can be moved up and down on the tower unit 84a along the main direction of extent 90a of the tower unit 84a. The shielding unit 22a can be moved up and down on the tower unit 84a under CNC control. The control and/or regulating unit 80a is configured to control the movement of the shielding unit 22a along the tower unit 84a. The induction heating unit 16a is supported movably on the tower unit 84a. The induction heating unit 16a comprises a carriage 96a. The carriage 96a of the induction heating unit 16a is configured for movably supporting the induction heating unit 16a on the tower unit 84a. The induction heating unit 16a preferably comprises at least two carriages 96a, as a result of which a particularly high degree of precision in the movement of the induction heating unit 16a can advantageously be achieved. The induction heating unit 16a can be moved up and down on the tower unit 84a along the main direction of extent 90a of the tower unit 84a. The induction heating unit 16a can be moved up and down on the tower unit 84a under CNC control. The control and/or regulating unit 80a is configured to control the movement of the induction heating unit 16a along the tower unit 84a. The tower unit 84a comprises at least one guide unit 62a with at least one guide rail 88a for the purpose of guiding a movement of the induction heating unit 16a and/or the shielding unit 22a. The guide unit 62a preferably has two guide rails 88a which extend parallel along the main direction of extent 90a of the tower unit 84a. A particularly linear movement control can consequently advantageously be achieved.

The induction heating unit 16a and the shielding unit 22a can be decoupled from each other operatively. The induction heating unit 16a and the shielding unit 22a form structural units which can move relative to each other in the axial direction 24a. The induction heating unit 16a and the shielding unit 22a form structural units which can move independently of each other in the axial direction 24a. The shrink-clamping and/or unshrink-unclamping station 18a comprises a driveshaft 44a (see FIG. 2). The driveshaft 44a is arranged at least largely in the tower unit 84a. The driveshaft 44a is configured to couple with the tool gripper unit 26a, in particular the shielding unit 22a. The driveshaft 44a is configured to couple with the induction heating unit 16a. The tool gripper unit 26a, in particular the shielding unit 22a and the induction heating unit 16a can be coupled to the driveshaft 44a independently of each other. In the state when coupled with the driveshaft 44a, the tool gripper unit 26a and/or the induction heating unit 16a are moved, during a rotation of the driveshaft 44a, up or down in the axial direction 24a, depending on a direction of rotation of the driveshaft 44a. The driveshaft 44a is configured to couple with the induction heating unit 16a and with the tool gripper unit 26a for the purpose of adjusting the axial positions of the induction heating unit 16a and of the tool gripper unit 26a independently of each other. The induction heating unit 16a can be coupled with the driveshaft 44a via a rolling ring drive 46a. The tool gripper unit 26a can be coupled with the driveshaft 44a via a further rolling ring drive 92a. The rolling ring drives 46a, 92a, together with the driveshaft 44a, in each case form a Uhing drive. The rolling ring drives 46a, 92a in each case have at least one Uhing drive nut 180a. For the purpose of coupling the induction heating unit 16a to the driveshaft 44a, the Uhing drive nut 180a associated with the rolling ring drive 46a of the induction heating unit 16a is clamped onto the driveshaft 44a, for example mechanically, pneumatically or hydraulically. For the purpose of coupling the tool gripper unit 26a with the driveshaft 44a, the Uhing drive nut 180a associated with the rolling ring drive 92a of the tool gripper unit 26a is clamped onto the driveshaft 44a, for example mechanically, pneumatically or hydraulically.

The shrink-clamping and/or unshrink-unclamping station 18a has a position determination system 58a. The position determination system 58a is configured to determine an exact position of the tool gripper unit 26a in the axial direction 24a or along the guide unit 62a. The position determination system 58a is configured to determine an exact position of the induction heating unit 16a in the axial direction 24a or along the guide unit 62a. The position determination system 58a in each case comprises a read head 60a which is configured to read the position of the induction heating unit 16a and/or the tool gripper unit 26a from the driveshaft 44a, in particular by means of a common ruler. The read heads 60a can be moved along the driveshaft 44a.

The shrink-clamping and/or unshrink-unclamping station 18a has a length adjustment unit 48a. The length adjustment unit 48a is configured to adjust the length of a tool 12a during the shrink-clamping process. The length adjustment unit 48a has a sensor unit 50a. The sensor unit 50a takes the form of an optical sensor unit 50a. The sensor unit 50a takes the form of a laser light barrier. The sensor unit 50a is arranged in an axial direction of movement 52a of the tool gripper unit 26a. The axial direction of movement 52a extends on the vertical axis 82a of the shrink-clamping and/or unshrink-unclamping station 18a. The sensor unit 50a is configured for a determination of a reference length of a tool 12a that is to be shrink-clamped. The sensor unit 50a is connected fixedly to the tower unit 84a. The sensor unit 50a is arranged along the vertical axis 82a above the induction heating unit 16a. The sensor unit 50a is arranged along the vertical axis 82a above the tool gripper unit 26a. The sensor unit 50a is arranged at an upper end of the tower unit 84a. The sensor unit 50a forms a sensor range 98a. The sensor unit 50a is configured to detect the presence of a portion of the tool 12a inside the sensor range 98a. The sensor unit 50a is configured to emit a detection signal to the control and/or regulating unit 80a when the presence of a portion of the tool 12a within the sensor range 98a is detected.

The shrink-clamping and/or unshrink-unclamping station 18a has a holding device 42a. The holding device 42a is configured for holding a tool holder 14a in the shrink-clamping and/or unshrink-unclamping station 18a. The holding device 42a comprises a spindle unit 100a. The spindle unit 100a can rotate. The spindle unit 100a fixedly connected to a base unit 102a of the shrink-clamping and/or unshrink-unclamping station 18a. The holding device 42a comprises an attachment holder 64a. The attachment holder 64a can be inserted replaceably into the spindle unit 100a. The attachment holder 64a is configured to supply an appropriate receiving region 104a for a specific type of tool holder. The holding device 42a comprises a length adjustment pin 106a. The length adjustment pin 106a can be moved along the vertical axis 82a. The shrink-clamping and/or unshrink-unclamping station 18a has a drive unit 108*a* with a friction clutch and a measurement system (not shown) which is configured to enable accurate measurement of the positioning and/or movement of the length adjustment pin 106*a*. The tool holder opening 40*a* of the tool holder 14*a* extends in the axial direction 24*a* of the tool holder 14*a* through the complete tool holder 14*a*. The length adjustment pin 106*a* can be moved through the tool holder opening 40*a* of the tool holder 14*a*. The length adjustment pin 106*a* is configured to form an abutment for a tool 12*a* inserted into the tool holder opening 40*a* of the tool holder 14*a*. Advantageously, with the knowledge of the lengths of the tool 12*a* and the tool holder opening 40*a*, a desired shrink-on and/or clamping depth is thus pre-settable.

The length adjustment unit 48*a* has a further sensor unit 54*a*. The further sensor unit 54*a* takes the form of a laser light barrier. The further sensor unit 54*a* is fixedly coupled with the induction heating unit 16*a* in an operation-ready state. The further sensor unit 54*a* is arranged along the vertical axis 82*a* below the induction heating unit 16*a*. The further sensor unit 54*a* can be moved together with the induction heating unit 16*a*. The further sensor unit 54*a* is configured for a determination of a position of a tool holder 14*a*, in particular of the tool holder opening 40*a* of the tool holder 14*a*, on the vertical axis 82*a*. The sensor unit 54*a* is configured to determine a position of the length adjustment pin 106*a*. For the determination of the position of the length adjustment pin 106*a*, the length adjustment pin 106*a* is pushed completely through the tool holder opening 40*a* until the length adjustment pin 106*a* protrudes from the tool holder 14*a* above the tool holder 14*a*, viewed in the direction of the vertical axis 82*a*. Apart from the relative positioning in the common axial direction 24*a* of the tool gripper unit 26*a* and the holding device 42*a*, a relative positioning of the tool gripper unit 26*a* and of the holding device 42*a* relative to each other is constant during the whole shrink-clamping process and/or during the whole unshrink-unclamping process. Apart from the relative positioning in the common axial direction 24*a* of the tool gripper unit 26*a* and the tool holder 14*a*, a relative positioning of the tool gripper unit 26*a* and of the tool holder 14*a* relative to each other is constant during the whole shrink-clamping process and/or during the whole unshrink-unclamping process. Apart from the relative positioning in the common axial direction 24*a* of the tool gripper unit 26*a* and the induction heating unit 16*a*, a relative positioning of the tool gripper unit 26*a* and of the induction heating unit 16*a* relative to each other is constant during the whole shrink-clamping process and/or during the whole unshrink-unclamping process.

The shrink-clamping and/or unshrink-unclamping station 18*a* has a handling robot 118*a*. The handling robot 118*a* takes the form of a multi-axis industrial robot. The handling robot 118*a* is configured to insert the tool holder 14*a* into the attachment holder 64*a* and/or into the spindle unit 100*a* and/or to remove it. The handling robot 118*a* is configured to insert the tool 12*a* into the shrink-clamping and/or unshrink-unclamping station 18*a* and/or to remove the tool 12*a* from the shrink-clamping and/or unshrink-unclamping station 18*a*. The handling robot 118*a* is configured to transfer the tool 12*a* to the tool gripper unit 26*a* and/or to accept the tool 12*a* from the tool gripper unit 26*a*. The fitting and/or removal which is performed by the handling robot 118 can alternatively also be carried out manually by an operator.

FIG. 4 shows a flow diagram of a method with the induction heating unit 10*a*. In at least one method step 110*a*, the induction heating unit 16*a* is placed on a tool holder 14*a* in which a tool 12*a* is fastened. In at least one further method step 112*a*, the movably supported shielding elements 28*a* of the shielding unit 22*a* are used in order to grip the tool 12*a*. In method step 112*a*, in the operating state in which the induction heating unit 16*a* is placed on the tool holder 14*a*, the tool 12*a* inserted into the tool holder 14*a* is gripped by the tool gripper unit 26*a* in a proximity of the tool holder opening 40*a* of the tool holder 14*a*. In at least one further method step 114*a*, the tool holder 14*a* is heated by the induction heating unit 16*a*. As a result of the heating, the tool holder opening 40*a* of the tool holder 14*a* is expanded such that the holding force which fastens the tool 12*a* in the tool holder opening 40*a* is relaxed. In at least one further method step 116*a*, the tool 12*a* gripped in the proximity of the tool holder opening 40*a* of the tool holder 14*a* is removed from the tool holder opening 40*a* by means of a movement of the tool gripper unit 26*a* along the vertical axis 82*a*.

FIG. 5 shows a flow diagram of a method with the shrink-clamping and/or unshrink-unclamping station 18*a*. Starting from the initial state 182*a*, the shrink-clamping and/or unshrink-unclamping station 18*a* is configured to perform a shrink-clamping process, possibly including a length adjustment (left-hand side of FIG. 5), or an unshrink-unclamping process (right-hand side of FIG. 5). In the shrink-clamping process, in at least one method step 120*a*, the tool holder 14*a* is inserted into the holding device 42*a*, in particular into the attachment holder 64*a*. The insertion can hereby be carried out manually by an operator or by the handling robot 118*a*. In at least one further method step 122*a*, the type of tool holder is input by an operator or automatically by reading a code, for example a QR code, a barcode or an RFID chip, or is detected by image recognition of a camera system. In at least one further method step 124*a*, a length of the tool holder 14*a*, a diameter of the tool holder opening 40*a* and/or an ideal shrink-on and/or clamping depth is determined on the basis of the tool holder type.

Alternatively or additionally, in at least one method step 126*a*, the length of the tool holder 14*a* can be determined by means of the further sensor unit 54*a*. Additionally, in method step 126*a*, the position of the length adjustment pin 106*a* can be calibrated by the length adjustment pin 106*a* being pushed completely through the tool holder opening 40*a* and detected by the further sensor unit 54*a*.

In at least one further method step 128*a*, the induction heating unit 16*a* is positioned under CNC control by a traversing along the vertical axis 82*a* to a height of a region of the tool holder 14*a* to be heated. In at least one further method step 130*a*, the tool gripper unit 26*a* formed by the shielding unit 22*a* is positioned under CNC control by a traversing along the vertical axis 82*a* above an outlet of the tool holder 14*a*. The tool gripper unit 26*a* is here positioned at a certain distance of a designated shrink-on and/or clamping depth (plus the thickness of the shielding elements 28*a* forming the tool gripper 30*a*) from the induction heating unit 16*a*. In at least one method sub-step 68*a* of a length adjustment step 66*a*, the tool 12*a* is inserted by the operator or by the handling robot 118*a* into the opened tool gripper 30*a*. In the length adjustment step 66*a*, for a determination of the designated shrink-on and/or clamping depth, the tool 12*a* is situated on the as yet unexpanded tool holder 14*a*, in particular on the unexpanded tool holder opening 40*a*. The tool 12*a* is here precentered by bearing on the tool holder 14*a* which ideally has an introduction stage. The position of a first end 136*a* of the tool 12*a* is determined as a result. In a further method sub-step 132*a* of the length adjustment step 66*a*, the tool 12*a* is gripped by the tool gripper 30*a* in a proximity of the working region 78*a* of the tool 12*a* and moved in the axial direction 24*a*, in particular upwards along the vertical axis 82a, until the tip 70a of the tool 12a is captured by the sensor unit 50a. The position of a second end 134a of the tool 12a is determined as a result. In at least one further method step 138a, a length of the tool 12a is determined by the control and/or regulating unit 80a with the aid of the positions of the first end 136a and the second end 134a of the tool 12a and with the aid of the displacement path traveled by the tool gripper unit 26a. In method step 138a, the ideal shrink-on and/or clamping depth of the tool 12a in the tool holder 14a is determined on the basis of the length of the tool 12a by the control and/or regulating unit 80a.

In at least one further method step 140a, the tool holder 14a is heated by the induction heating unit 16a and the tool holder opening 40a is consequently expanded. The adjustment of the induction magnetic field and/or the heating duration is here performed on the basis of the determined or read data of the tool holder 14a. In at least one further method step 142a, the tool 12a is inserted into the expanded tool holder opening 40a. The shrink-on and/or clamping depth of the tool 12a is here fixed by a vertical movement of the tool gripper unit 26a.

Alternatively or additionally, the calibration of the length adjustment pin 106a can be used in order to create an abutment for the tool 12a inserted into the tool holder 14a. For this purpose, in a method step 144a, a position of the length adjustment pin 106a calibrated by means of the further sensor unit 54a is adjusted relative to that length of the tool holder 14a which is determined by the further sensor unit 54a in such a way that the abutment formed by the length adjustment pin 106a is accurate for the designated shrink-on and/or clamping depth of the tool 12a. In at least one further method step 146a, subsequent to the insertion of the tool 12a into the tool holder 14a, the tool gripper 30a is opened and the tool gripper unit 26a and the induction heating unit 16a are moved along the vertical axis 82a upwards over the tip 70a of the tool 12a. In at least one further method step 148a, the still warm tool holder 14a is cooled by the cooling unit 86a. In at least one further method step 150a, the tool holder 14a and the tool 12a are removed from the shrink-clamping and/or unshrink-unclamping station 18a by the operator or by the handling robot 118a. During the whole above-described shrink-clamping process, the tool gripper unit 26a and the induction heating unit 16a are traversed exclusively along a single axis, in particular exclusively along a designated axis of rotation 154a of the tool 12a that is to be shrink-clamped.

During the unshrink-unclamping process, in at least one method step 152a, a tool holder with a tool 12a clamped therein is inserted into the holding device 42a by the operator or by the handling robot 118a. In at least one further method step 156a, the induction heating unit 16a is positioned under CNC control by a traversing along the vertical axis 82a to a height of a region of the tool holder 14a which is to be heated. In at least one further method step 158a, the tool gripper unit 26a formed by the shielding unit 22a is positioned under CNC control by a traversing along the vertical axis 82a above an outlet of the tool holder 14a. In method step 158a, the tool gripper unit 26a is positioned in such a way that the tool gripper 30a can grip the tool 12a in the proximity of the tool holder opening 40a. In at least one further method step 160a, the tool gripper 30a is closed. In at least one further method step 162a, a heating function of the induction heating unit 16a is activated. In at least one tool removal step 72a, a removing force is exerted on the tool 12a by means of a tool gripper unit 26a as early as during a heating-up phase of the unshrink-unclamping process in which the tool holder 14a is expanded by inductive heating. In at least one further method step 164a, the tool 12a is removed along the vertical axis 82a upwards from the tool holder opening 40a of the tool holder 14a immediately once a force retaining the tool 12a in the tool holder 14a falls below the removing force. A particularly rapid and secure dismounting of tools 12a from tool holders 14a can consequently advantageously be achieved, in particular even when, for example, the tool 12a and the tool holder 14a are formed from a similar or identical material (for example, high-speed steel).

In at least one further method step 166a, the tool gripper unit 26a and the induction heating unit 16a are moved upwards so far along the vertical axis 82a that the cooling unit 86a coupled to the induction heating unit 16a can cool the tool holder 14a. In at least one further method step 168a, the removed tool 12a and the sufficiently cooled tool holder 14a are removed from the shrink-clamping and/or unshrink-unclamping station 18a by the operator or by the handling robot 118a. During the whole above-described unshrink-unclamping process, the tool gripper unit 26a and the induction heating unit 16a are traversed exclusively along a single axis, in particular exclusively along the designated axis of rotation 154a of the tool 12a to be unshrink-unclamped.

Three further exemplary embodiments are shown in FIGS. 6 to 10. The following descriptions and the drawings are restricted substantially to the differences between the exemplary embodiments, wherein, with respect to components which are designated in the same way, in particular with respect to components with the same reference numerals, reference can be made in principle also to the drawings and/or the description of the other exemplary embodiments, in particular of FIGS. 1 to 5. The letter a is suffixed to the reference numerals of the exemplary embodiment in FIGS. 1 to 5 in order to distinguish the exemplary embodiments. The letter a is replaced by the letters b to d in the exemplary embodiments in FIGS. 6 to 10.

FIG. 6 shows a schematic plan view of part of an alternative shielding unit 22b, forming an alternative tool gripper unit 26b, of an alternative induction heating unit 10b of an alternative shrink-clamping and/or unshrink-unclamping station 18b. The shielding unit 22b comprises two movably supported shielding elements 28b. The movably supported shielding elements 28b form a tool gripper 30b of the tool gripper unit 26b. The movably supported shielding elements 28b form slide elements 38b which are displaceable perpendicularly to the axial direction 24b. In a plan view, viewed along the vertical axis 82b, the movably supported shielding elements 28b in each case have a prismatic, in particular triangular recess 170b, 172b. The prismatic, in particular triangular recesses 170b, 172b are configured to grasp different tools 12b with different diameters and at the same time to shield the induction magnetic field along the vertical axis 82b in an upward direction. The movably supported shielding elements 28b can be moved towards each other. The movably supported shielding elements 28b are configured to overlap each other in a viewing direction along the vertical axis 82b.

FIG. 7 shows a schematic side view of part of the alternative shielding unit 22b forming the alternative tool gripper unit 26b. One of the movably supported shielding elements 28b is designed so that it is slotted along the vertical axis 82b. The opposite shielding element 28b is designed so that it is non-slotted. The shielding element 28b which is designed so that it is non-slotted is configured to engage in the shielding element 28b with a slotted design when the shielding elements 28b move towards each other. Tilting of a tool 12b which is held by the tool gripper 30b formed by the shielding elements 28b can consequently advantageously be avoided.

FIG. 8 shows a schematic plan view of part of a second alternative shielding unit 22c, forming a second alternative tool gripper unit 26c, of a second alternative induction heating unit 10c of a second alternative shrink-clamping and/or unshrink-unclamping station 18c. The shielding unit 22c comprises two movably supported shielding elements 28c. The movably supported shielding elements 28c form a tool gripper 30c of the tool gripper unit 26c. The movably supported shielding elements 28c form slide elements 38c which are displaceable perpendicularly to the axial direction 24c. The movably supported shielding elements 28c have the shape of a truncated wedge. The movably supported shielding elements 28c are arranged at regular intervals in a circle around the centre of the shielding unit 22c. The movably supported shielding elements 28c can be moved towards each other. The movably supported shielding elements 28c are configured to overlap each other in a viewing direction along the vertical axis 82c.

FIG. 9 shows a schematic plan view of part of a third alternative shielding unit 22d, forming a third alternative tool gripper unit 26d, of a third alternative induction heating unit 10d of a third alternative shrink-clamping and/or unshrink-unclamping station 18d. The shielding unit 22d comprises two movably supported shielding elements 28d. The movably supported shielding elements 28d form a tool gripper 30d of the tool gripper unit 26d. The movably supported shielding elements 28d at least form slide elements 38d which are displaceable perpendicularly to the axial direction 24d. The slide elements 28d are guided along curved slideways 174d. The shielding elements 28d take the form of rollers. The shielding elements 28d can in each case rotate about a roller axis 176d. The roller axes 176d extend parallel to a vertical axis 82d of the shrink-clamping and/or unshrink-unclamping station 18d. The shielding unit 22d has a drive unit 178d. The drive unit 178d is configured to generate a rotation at least of a shielding element 28d which takes the form of a roller. The driven rotation of the shielding element 28d which takes the form of a roller is configured to rotate a tool 12d held by the shielding element 28d, in particular the tool gripper 30d.

The invention claimed is:

1. An induction heating device for a shrink-clamping and/or unshrink-unclamping of tools into and/or from tool holders,
with an induction heating unit of a shrink-clamping and/or unshrink-unclamping station for the tools, the induction heating unit comprising at least one induction coil which is configured to expand, by heating, at least a portion of the tool holder during a shrink-clamping and/or unshrink-unclamping process, and
with at least one shielding unit which is arranged along a vertical axis above the induction heating unit, and which is specially designed at least for a shielding of an induction magnetic field generated by the induction coil of the induction heating unit from the tool that is to be shrink-clamped and/or unshrink-unclamped at least substantially in an axial direction of the induction coil in order to prevent the tool from being heated during the shrink-clamping process and/or during the unshrink-unclamping process,
wherein the induction heating unit and the shielding unit form structural units which can be operatively decoupled from each other and can thus be moved relative to each other at least in the axial direction,
wherein the shielding unit at the same time forms a tool gripper unit which is configured to insert a tool into the tool holder and/or remove it from the tool holder,
wherein the shielding unit comprises an arrangement of movably supported shielding elements,
wherein the movably supported shielding elements form a tool gripper of the tool gripper unit,
wherein the movably supported shielding elements are displaceable relative to each other in such a way that they form an at least substantially closed shielding plane with a variable opening for receiving tools with different diameters, and
wherein the movably supported shielding elements that form the tool gripper form blades of a bladed shutter or slide elements which are displaceable at least perpendicularly to the axial direction.

2. The induction heating device according to claim 1, wherein the shielding elements are implemented at least largely from a soft magnetic, essentially electrically non-conductive material.

3. A shrink-clamping and/or unshrink-unclamping station for tools for an at least largely automated shrink-clamping and/or unshrink-unclamping of the tools into and/or from tool holders
with a tool gripper unit which is configured to move a tool along an axial direction of the tool holder and thereby insert the tool for the purpose of performing a shrink-clamping process into the tool holder and/or to remove the tool for the purpose of performing an unshrink-unclamping process from the tool holder, and
with a holding device for holding the tool holder,
wherein the tool gripper unit cannot be moved in a direction perpendicular to the axial direction, so that a relative positioning of a tool gripper of the tool gripper unit and of the holding device relative to each other, apart from a relative positioning in a common axial direction of the tool gripper unit and the holding device, is constant during the whole shrink-clamping process and/or during the whole unshrink-unclamping process, and
wherein the tool gripper unit is configured to move the tool inside the shrink-clamping and/or unshrink-unclamping station exclusively along a vertical axis.

4. The shrink-clamping and/or unshrink-unclamping station according to claim 3,
comprising an induction heating unit, wherein a relative positioning of the tool gripper unit and of the induction heating unit relative to each other, apart from the relative positioning in a common axial direction of the tool gripper unit and the induction heating unit, is at least substantially constant during the whole shrink-clamping process and/or during the whole unshrink-unclamping process.

5. The shrink-clamping and/or unshrink-unclamping station according to claim 3,
comprising a driveshaft which is configured to couple with the tool gripper unit and with the induction heating unit for the purpose of an independent adjustment of the axial positions of the induction heating unit and of the tool gripper unit.

6. The shrink-clamping and/or unshrink-unclamping clamping station according to claim 5,
wherein the induction heating unit and the tool gripper unit can respectively be coupled with the driveshaft via a rolling ring drive.

7. The shrink-clamping and/or unshrink-unclamping station according to claim 4,
wherein the shielding unit and the tool gripper unit are implemented at least partially integrally with each other.

8. The shrink-clamping and/or unshrink-unclamping station according to claim 3,
comprising a length-adjustment unit which is configured to adjust a length of a tool during the shrink-clamping process.

9. The shrink-clamping and/or unshrink-unclamping station according to claim 8,
wherein the length-adjustment unit has at least one, in particular optical and/or tactile, sensor unit, which is arranged in an axial movement direction of the tool gripper unit and which is configured for a determination of a reference length of a tool that is to be shrink-clamped.

10. The shrink-clamping and/or unshrink-unclamping station according to claim 8,
wherein the length-adjustment unit has a further, in particular optical, sensor unit, which is fixedly coupled with the induction heating unit in an operation-ready state.

11. A method for use with a shrink-clamping and/or unshrink-unclamping station according to claim 3,
the shrink-clamping and/or unshrink-unclamping station further having at least one induction heating unit, a holding device for tool holders, and a tool gripper unit,
the method comprising at least one of shrink-clamping the tool into the tool holder and unshrink-unclamping the tool from the tool holder.

12. The method according to claim 11,
wherein the tool gripper unit is traversed exclusively along a single axis, in particular exclusively along a designated axis of rotation of the tool that is shrink-clamped and/or unshrink-unclamped, during the whole shrink-clamping process and/or during the whole unshrink-unclamping process.

13. A method performed by the shrink-clamping and/or unshrink-unclamping station according to claim 10, the method comprising
shrink clamping the tool into the tool holder.

14. The method according to claim 13,
wherein,
in at least one length adjustment step for a determination of a designated shrink-on and/or clamping depth of the tool, the tool is placed on the still unexpanded tool holder, and
the tool is subsequently moved in the axial direction until a tip of the tool is captured by an in particular optical or tactile sensor unit.

15. A method performed by the shrink-clamping and/or unshrink-unclamping station according to claim 3, the method comprising unshrink unclamping the tool from the tool holder.

16. The method according to claim 15,
wherein, in at least one tool removal step, as early as during a heating-up phase of an unshrink-unclamping process in which the tool holder is expanded by inductive heating, a pulling removal force is exerted onto the tool by means of the tool gripper unit of the shrink-clamping and/or unshrink-unclamping station.

17. An induction heating device for a shrink-clamping and/or unshrink-unclamping of tools into and/or from tool holders,
with an induction heating unit of a shrink-clamping and/or unshrink-unclamping station for the tools, the induction heating unit comprising at least one induction coil which is configured to expand, by heating, at least a portion of the tool holder during a shrink-clamping and/or unshrink-unclamping process, and
with at least one shielding unit which is arranged along a vertical axis above the induction heating unit, and which is specially designed at least for a shielding of an induction magnetic field generated by the induction coil of the induction heating unit from the tool that is to be shrink-clamped and/or unshrink-unclamped at least substantially in an axial direction of the induction coil in order to prevent the tool from being heated during the shrink-clamping process and/or during the unshrink-unclamping process,
wherein the induction heating unit and the shielding unit form structural units which can be operatively decoupled from each other and can thus be moved relative to each other at least in the axial direction,
wherein the shielding unit comprises an arrangement of movably supported shielding elements, and
wherein the shielding elements are implemented at least largely from a soft magnetic ferrite.

* * * * *